United States Patent
Osaka

[15] 3,687,152
[45] Aug. 29, 1972

[54] CONTROL DEVICE FOR GRADUALLY INCREASING FLUID PRESSURE

[72] Inventor: Takashi Osaka, Kaga, Japan
[73] Assignee: Kabushiki Kaisha Komatsu Seisakusho, Tokyo, Japan
[22] Filed: July 21, 1970
[21] Appl. No.: 56,812

[30] Foreign Application Priority Data

July 23, 1969 Japan...................44/58171

[52] U.S. Cl..................................137/115
[51] Int. Cl....................................G05d 11/00
[58] Field of Search.................137/115, 117, 118

[56] References Cited

UNITED STATES PATENTS 2,989,975  6/1961  Gärtner.................137/117

Primary Examiner—M. Cary Nelson
Assistant Examiner—David J. Zobkiw
Attorney—Cushman, Darby & Cushman

[57] ABSTRACT

A control device for gradually increasing fluid pressure interposed between a pressure generating source and an actuator and comprising a cylindrical valve in which a pressure regulator valve and a quick return valve are fitted, wherein the said quick return valve is adapted to be held under its actuated condition at a position where the drain port of a back-pressure chamber is slightly opened by the quick return valve itself by allowing an urging force due to the fluid pressure inside of the passage communicating with the actuator acting on one side of the said valve to balance with an urging force due to biasing force of a spring combined with the fluid pressure inside of the back-pressure chamber acting on the other side of the said valve, the said back-pressure chamber being located at the back of the cylindrical valve, thereby actuating the said quick return valve sensitively in response to even a slight pressure drop in the passage communicating with the actuator to drain off the fluid inside of the back-pressure chamber, so as to ensure that the cylindrical valve always effects its function to gradually increase fluid pressure.

3 Claims, 4 Drawing Figures

INVENTOR.
TAKASHI OSAKA
BY CUSHMAN, DARBY &
CUSHMAN

ATTORNEYS

CONTROL DEVICE FOR GRADUALLY INCREASING FLUID PRESSURE

The present invention relates to a control device for gradually increasing fluid pressure interposed between a pressure generating source and an actuator such as a brake or clutch cylinder for a selected gear train in hydraulic transmission gear, and more particularly to a control device for gradually increasing fluid pressure wherein a quick return valve mounted inside of the said control device is capable of sensitively actuating in response to a pressure drop in the actuator.

Commonly, in hydraulic drives, the shock load is developed in a hydraulic power transmission system at the time of speed change such shocks must be properly absorbed to improve the durability of the power transmission system, and the prior art has provided a control device for gradually increasing fluid pressure as shown in FIG. 1 between a pressure generating source and an actuator for achieving an improved comfortable ride in vehicles.

Referring to FIG. 1, the reference numeral 1 denotes a valve casing in which are slidably fitted a cylindrical valve 2 and a quick return valve 3. With the valve casing 1 are connected, in predetermined places, a fluid inlet conduit 4 communicating with a fluid pressure source, a conduit 5 which is communicated with the said conduit 4 and introduces pressure fluid into an actuator such as brake cylinder, etc., a conduit 6 for a flow pressure circuit and a conduit 7 for supplying pressure fluid for actuating a torque convertor, etc. The cylindrical valve 2 slidably fitted into the valve casing 1 is perforated to form radial passages 8, 9 and 10 for blowing off the pressure fluid. Further, the cylindrical valve 2 is biased at its end by a compression spring 11 towards the valve casing 1. The reference numeral 12 denotes a spool type pressure regulator valve having a reduced diameter portion 13 in the intermediate part thereof. This pressure regulator valve 12 is slidably fitted into the cylindrical valve 2 and is urged at its end by the biasing force of a pressure regulator spring 14 towards the base of the cylindrical valve 2. In the base portion of the pressure regulator valve, is mounted a mechanism for the prevention of vibration which comprises a piston 15 formed with an orifice, a rod piston 16 and a spring 17. The space defined by the said pistons 15 and 16 is communicated with the exterior of pressure regulator valve 12 through the orifice of the piston 15 and a fluid inlet hole 18 perforated on the valve 12. The reference numeral 19 denotes a back-pressure chamber which is formed between the back of the head part of the cylindrical valve 2 and a quick return valve 3, and the pressure inside of which urges the cylindrical valve 2 in the left direction in the drawing.

On the other hand, the quick return valve 3 is formed with an orifice 20 and a drain passage 21. In the illustrated neutral position, the drain passage 21 is allowed to communicate with the above-mentioned back-pressure chamber 19, thereby to drain off the fluid inside of the latter. The orifice 20 is arranged to allow the said passage 5 to communicate with the back-pressure chamber 19, thereby to introduce the pressure fluid inside of the passage 5 into the chamber 19, when the quick return valve has moved to the right due to an increased fluid pressure inside of the passage 5. The reference numerals 22 and 23 denote a return spring for the said quick return valve 3 and a drain port respectively.

In the prior art control device constructed as mentioned above, the actuation of the quick return valve 3 in response to a change in the fluid pressure inside of the passage 5 communicated with actuator is unsatisfactory due to the fact that the quick return valve 3 which has moved to the right end position against the biasing force of the spring 22 due to a pressure increase in the passage 5 communicating with the actuator, i.e., which is kept in its actuated condition can be returned to its original position only by the biasing force of the spring 22, the said biasing force being not so great as to keep the initial pressure of the control device low, and also that when the quick return valve 3 has moved about half of the whole stroke, the back-pressure chamber 19 can hardly communicate with the drain passage 21. Particularly, in case where the pump capacity is great enough to fill the actuator such as clutch cylinder, etc. with pressure fluid in an extremely short time, the fluid pressure inside of the passage 5 drops only momentarily when the selector is changed over, thereby making the response of the quick return valve 3 impossible, which results in that the pressure fluid inside of the back-pressure chamber 19 can not be drained and consequently the cylindrical valve 2 can not be returned to its original position, which renders the control of gradual increase of fluid pressure at the time of change-over of the selector valve impossible.

This invention has been made in order to eliminate such drawback as mentioned above. The object of this invention is to provide a control device for gradually increasing fluid pressure wherein a quick return valve is adapted to be held under its actuated condition at a position where the drain port of a back-pressure chamber is slightly opened by the quick return valve itself by allowing an urging force due to the fluid pressure inside of the passage communicating with the actuator acting on one side of the said valve to balance with an urging force due to biasing force of a spring combined with the fluid pressure inside of the back-pressure chamber acting on the other side of the said valve, the said back-pressure chamber being located at the back of the cylindrical valve, thereby actuating the said quick return valve sensitively in response to even a slight pressure drop in the passage communicating with the actuator to drain off the fluid inside of the back-pressure chamber, so as to ensure that the cylindrical valve will always effect its function of gradually increasing fluid pressure.

The embodiment of this invention will now be described below with reference to the accompanying drawings wherein.

Figure 1:
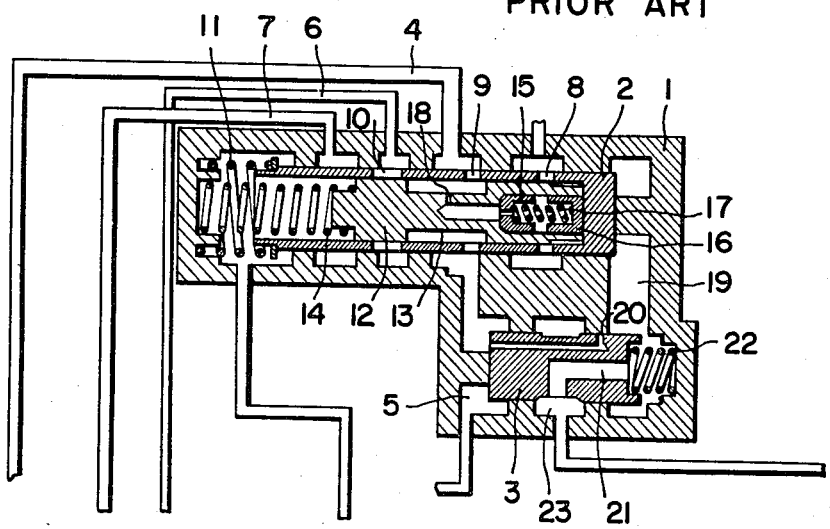
FIG. 1 is a diagrammatic sectional view of a well-known prior art control device for gradually increasing fluid pressure.
Figure 2:
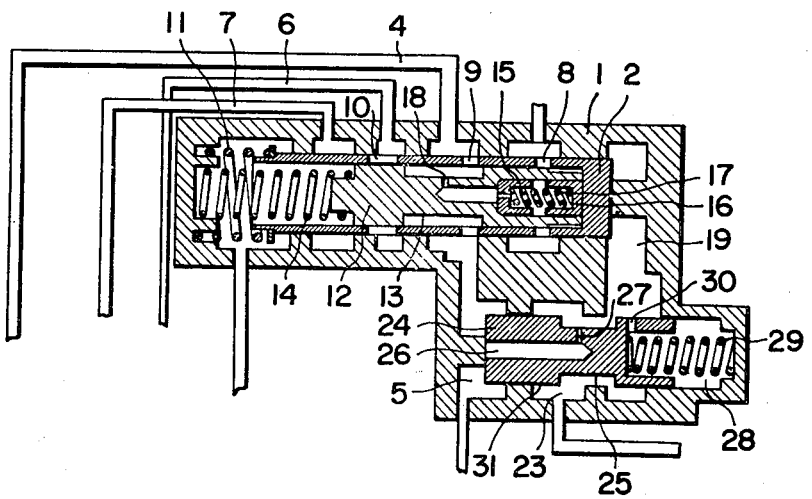
FIG. 2 is a diagrammatic sectional view of a control device for gradually increasing fluid pressure in accordance with this invention.
Figure 3:
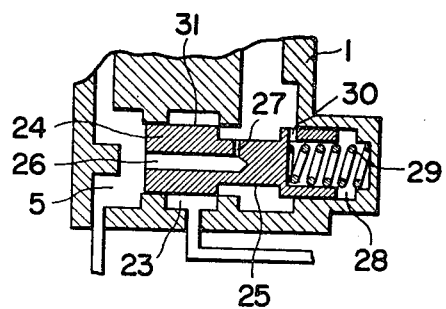
FIG. 3 shows the manner in which the principal part as shown in FIG. 2 operates.

The arrangement of the control device for gradually increasing fluid pressure according to this invention will now be described with reference to the embodiment as shown in FIG. 2.

In FIG. 2, the reference numeral 24 denotes a quick return valve embodying this invention. The quick return valve 24 is formed at its intermediate part with a reduced diameter portion 25 and is also perforated on the side of the passage 5 communicating with an actuator to form a bore 26 which is closed by the valve casing 1 in the illustrated neutral position. The bore 26 and the reduced diameter portion 25 are adapted to communicate with an orifice 27 respectively. On the other side of the quick return valve 24 is formed a cylindrical spring housing 28, in which a back-pressure spring 29 is accommodated with one end thereof abutting against the valve casing 1. The spring housing 28 accommodating the spring 29 therein communicates with a back-pressure chamber 19 which is formed at the back of the cylindrical valve 2 through an opening 30. This opening 30 is adapted to open always the communication between the chamber 19 and housing 28 irrespective of the movement of the quick return valve 24, and the biasing force of the spring 29 is such that it can offer a resistance in combination with the pressure inside of the back-pressure chamber 19 against the movement of the quick return valve in the right direction due to a pressure increase in the passage 5, and allow the quick return valve to be held in balance at a position where the drain port 23 is slightly opened by the reduced diameter portion 25 adjacent the right end of the land 31 of the quick return valve 24.

Since the control device according to this invention is constructed as mentioned above, when the pressure fluid supplied from a fluid pressure generating source flows into the device through the conduit 4, the pressure fluid also passes through the passage 5 communicating with the conduit 4 into an actuator (not shown) such as a clutch cylinder for vehicle, etc., to fill the latter and thus the pressure inside of the passage 5 increases suddenly. When the above mentioned pressure reaches a predetermined level, the quick return valve 24 is moved to the right against the biasing force of the spring 29 and the drain port 23 is closed by the land 31, whereby the pressure fluid inside of the passage 5 commences to flow through the bore 26 and orifice 27 into the back-pressure chamber 19. When the fluid pressure increases further, the pressure regulator valve 12 is moved to the left against the biasing force of a spring 14 by an action of a rod piston 16, and a reduced diameter portion 13 registers and communicates with the radial passage 10 of the cylindrical valve, thereby balancing the valve 12.

On the one hand, when the back-pressure chamber 19 is filled with the pressure fluid through the orifice 27 of the quick return valve 24, the fluid pressure inside of the back-pressure chamber begins to increase to become equal to that in the passage 5, and such fluid pressure increase in the back-pressure chamber causes the cylindrical valve 2 to move to the left against the biasing force of the spring 11. This means that the radial passage 10 is moved to the left and so the communication between the reduced diameter portion 13 and the radial passage 10 is interrupted. Therefore, the fluid inside of the reduced diameter portion 13 can not blow out from the radial passage 10 unless the fluid pressure inside of the portion 13 increases further. Thus, the fluid pressure in the inlet conduit 4 and the passage 5 communicating with an actuator increases in proportion to the moving rate of the cylindrical valve 2, and the moving rate of the cylindrical valve 2, i.e., the fluid pressure increase in the back-pressure chamber 19 is regulated by the orifice 27 of the quick return valve 24, so that the fluid pressure can automatically and gradually increase at a definite rate. When the cylindrical valve 2 reaches its left extreme end, the fluid pressure ceases to increase further and is maintained at such level (referred to as "set pressure").

With the termination of the cylindrical valve 2, operation of the fluid pressure inside chamber 19 increases to become equal to that in the passage 5. Then, the fluid pressure in the back-pressure chamber 19 acts on the spring housing 28 through the opening 30, so that the quick return valve 24 can be held at a position where the urging force due to the fluid pressure inside of the passage 5 acting on one side of the said valve is balanced with the urging force due to biasing force of the spring 28 combined with the fluid pressure inside of the back-pressure chamber 19 acting on the other side of the said valve. If the fluid pressure inside of the passage 5 decreases even a little under such balanced condition, the balance between the urging forces is lost and the quick return valve 24 is moved back to the left by the biasing force of the spring 28 in combination with the urging force due to the fluid pressure in the back-pressure chamber 19 to open the drain port 23 and momentarily drop the pressure inside of the back-pressure chamber 19. Then, the urging force on the side of the passage 5 overcomes the urging force on the spring housing 28, thereby to move the quick return valve 24 to the right. This means that the pressure fluid reaching the back-pressure chamber 19 through the orifice 27 is drained through the drain port 23 under the pressure inside of the back-pressure chamber 19 which is balanced with the pressure in the passage 5, and so the quick return valve 24 serves as a relief valve and is held at a position where the drain port 23 is slightly opened.

When the selector valve is changed over to a actuate another actuator, the fluid pressure inside of the passage 5 drops momentarily, while the quick return valve 24 is held at a position where the communication between the back-pressure chamber 19 and the drain port 23 is slightly opened, so that the quick return valve 24 can allow the pressure fluid inside of the chamber 19 to be drained off in response to the pressure drop in the passage 5 and allow the cylindrical valve 2 to move in the right direction back to the position where the gradual increase of fluid pressure is commenced.

Figure 4:
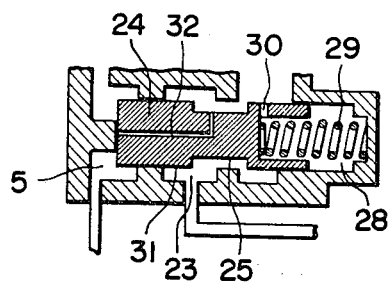
FIG. 4 shows another embodiment of the principal part.

In the above-mentioned embodiment of this invention, the reduced diameter portion 25 of the quick return valve 24 is adapted to communicate with one end thereof on the side of the passage 5 through the bore 26 and the orifice 27. Such communication is, however, not limited to the combination of the bore 26 and orifice 27, an aperture 32 as shown in FIG. 4 may be used for the purpose. In this case, the diameter of the aperture 32 should be such that the throttle effect as in the case of the embodiment previously mentioned can be obtained when the pressure fluid flows through the passage 5 into the back-pressure chamber 19.

As mentioned above, according to this invention, the return movement of the quick return valve is effected not only by the biasing force of a spring but also by the fluid pressure inside of the back-pressure chamber, and the quick return valve is held in balance at a position where the drain port is slightly opened and serves as a relief valve. Therefore, the quick return valve can actuate immediately in response to a momentary pressure drop in the passage communicating with an actuator to ensure the pressure fluid inside of the back-pressure chamber to be drained off, thereby making it possible to return the cylindrical valve to the position where the gradual increase of fluid pressure is commenced and provide always an exact and effective action for gradually increasing fluid pressure.

What is claimed is:

1. In a control device for gradually increasing fluid pressure interposed between a pressure generating source and an hydraulic actuator including a valve casing including a fore-pressure chamber which is in fluid communication with said hydraulic actuator, a back-pressure chamber, a drain port and a cylindrical valve in which is fitted a pressure regulator valve for regulating fluid pressure and having radial passages for blowing off pressure fluid, said radial passages being movable in response to an increase of pressure in said back-pressure chamber to cause said pressure regulator to block said radial passages to gradually increase fluid pressure in said actuator, and a quick return valve which is movably mounted between said fore- and back-pressure chambers for movement from a first position in which said quick return valve blocks said fore- from said back-pressure chamber and in which said back-pressure chamber is in communication with said drain port to a second position in which said quick return valve allows communication between said chambers and a spring for biassing said quick return valve to said first position, the improvement comprising that said quick return valve is constructed so that is back side is directly connected only with said back-pressure chamber so that when the pressure in said fore-pressure chamber is suddenly reduced the drain port of said back-pressure chamber is slightly opened by the pressure in said back-pressure chamber against the back side of the quick return valve itself thus quickly reducing the pressure in said back-pressure chamber and allowing an urging force due to the fluid pressure inside said fore-pressure chamber acting on one side of said quick return valve to balance with an urging force due to the biassing force of said spring combined with the fluid pressure inside of the back-pressure chamber acting on the back side of said quick return valve whereby the sensitivity of said quick return valve to pressure variations in said fore-pressure chamber is heightened so that when said pressure in said fore-pressure chamber is reduced to a predetermined level, the quick return valve is quickly forced to its first position in which communication between said fore- and back-pressure chambers is cut-off and said quick return valve fully communicates said drain port and said back-pressure chamber whereby said back-pressure chamber's pressure, and thus the pressure acting upon said cylindrical valve, is quickly reduced.

2. A control device for gradually increasing fluid pressure as claimed in claim 1, characterized by that the quick return valve is formed at its intermediate part with a reduced diameter portion which is adapted to open and block the communication between the back-pressure chamber and the drain port by the movement of said quick return valve, the said reduced diameter portion further being adapted with a bore and an orifice, for communicating said fore-pressure chamber with said back-pressure chamber, said bore being adapted to be closed by the valve casing in said first position, and further including a spring housing formed on the back side of the quick return valve which is adapted to communicate always with the back-pressure chamber.

3. A control device for gradually increasing fluid pressure as claimed in claim 1, characterized by that the quick return valve is formed at its intermediate part with a reduced diameter portion which is adapted to open and block the communication between the back-pressure chamber and the drain port by the movement of said quick return valve, said reduced diameter portion is adapted with an aperture, in its second position to communicate the fore-pressure chamber with the back-pressure chamber said aperture being adapted to be closed by the valve casing at the first position to provide a throttle effect, and further including a spring housing formed on the back side of the quick return valve which is adapted to communicate always with the back-pressure chamber.

* * * * *